(12) United States Patent
Reichert

(10) Patent No.: US 10,322,453 B2
(45) Date of Patent: *Jun. 18, 2019

(54) SINTERING APPARATUS

(71) Applicant: Amann Girrbach AG, Koblach (AT)

(72) Inventor: Axel Reichert, Widnau (CH)

(73) Assignee: Amann Girrbach AG, Koblach (AT)

( * ) Notice: Subject to any disclaimer, the term of this patent is extended or adjusted under 35 U.S.C. 154(b) by 356 days.

This patent is subject to a terminal disclaimer.

(21) Appl. No.: 14/779,140

(22) PCT Filed: Feb. 28, 2014

(86) PCT No.: PCT/AT2014/000040
§ 371 (c)(1),
(2) Date: Sep. 22, 2015

(87) PCT Pub. No.: WO2014/169303
PCT Pub. Date: Oct. 23, 2014

(65) Prior Publication Data
US 2016/0052055 A1    Feb. 25, 2016

(30) Foreign Application Priority Data
Apr. 18, 2013  (EP) .................................. 13002055

(51) Int. Cl.
*B22F 3/10* (2006.01)
*B22F 3/00* (2006.01)
(Continued)

(52) U.S. Cl.
CPC ............ *B22F 3/1007* (2013.01); *B22F 3/003* (2013.01); *B22F 5/00* (2013.01); *C04B 35/64* (2013.01);
(Continued)

(58) Field of Classification Search
CPC ..... A61C 13/12; A61C 13/0006; A61C 13/20; F27D 7/06; B22F 3/1003; B22F 3/003;
(Continued)

(56) References Cited

U.S. PATENT DOCUMENTS 2,002,241 A   5/1935 Forde
3,295,844 A   1/1967 Neeley et al.
(Continued)

FOREIGN PATENT DOCUMENTS

CN    201543821    8/2010
CN    102901356    1/2013
(Continued)

OTHER PUBLICATIONS

Illustration "MULTIMAT2SINTER" Dentsply admitted prior art. (Jan. 1, 2012).
(Continued)

*Primary Examiner* — Nahida Sultana
(74) *Attorney, Agent, or Firm* — Volpe and Koenig, P.C.

(57) ABSTRACT

A sintering apparatus (4) for sintering at least one workpiece (2), more particularly a dental workpiece, having a sintering chamber (18) for receiving the sintering workpiece (2) during sintering, wherein the sintering chamber (18) is delimited by a base surface (6) of the sintering apparatus (4) on which the workpiece can be placed during sintering, wherein the sintering apparatus (4) has at least one gas feed (5) for introducing protective gas into the sintering chamber (18), wherein the gas feed (5) is on the side of the base surface (6) that faces away from the sintering chamber (18) and the base surface (6) has at least one flow-through portion (14) which is permeable to the protective gas to allow the protective gas coming from the gas feed (5) to pass into the sintering chamber (18).

18 Claims, 4 Drawing Sheets

(51) Int. Cl.
*B22F 5/00* (2006.01)
*F27B 5/04* (2006.01)
*F27B 5/06* (2006.01)
*F27B 17/02* (2006.01)
*F27D 7/02* (2006.01)
*C04B 35/64* (2006.01)

(52) U.S. Cl.
CPC .................. *F27B 5/04* (2013.01); *F27B 5/06* (2013.01); *F27B 17/025* (2013.01); *F27D 7/02* (2013.01); *B22F 2003/1042* (2013.01); *B22F 2201/10* (2013.01); *C04B 2235/6586* (2013.01)

(58) Field of Classification Search
CPC ...... B22F 2003/1042; B22F 2003/1014; F27B 17/025; B28B 11/243; C04B 35/56; C04B 35/486; C04B 35/111; C04B 35/587; C04B 35/64; C04B 2235/658
See application file for complete search history.

(56) References Cited

U.S. PATENT DOCUMENTS

| | | | |
|---|---|---|---|
| 4,724,121 A | 2/1988 | Weyand | |
| 5,048,801 A | 9/1991 | Johnson et al. | |
| 5,352,395 A | 10/1994 | Kallenbach et al. | |
| 5,432,319 A | 7/1995 | Indig | |
| 5,604,919 A | 2/1997 | Sterzel et al. | |
| 5,911,102 A | 6/1999 | Takahashi et al. | |
| 6,027,686 A | 2/2000 | Takahashi et al. | |
| 6,696,015 B2 | 2/2004 | Tokuhara et al. | |
| 6,891,140 B2 | 5/2005 | Sato et al. | |
| 7,767,942 B2 | 8/2010 | Stephan et al. | |
| 8,591,803 B2 | 11/2013 | Wolff et al. | |
| 9,033,703 B2 * | 5/2015 | Rohner | A61C 13/20 219/539 |
| 2004/0042923 A1 * | 3/2004 | Hirasawa | B22F 3/003 419/56 |
| 2006/0006589 A1 | 1/2006 | Canova et al. | |
| 2006/0154827 A1 * | 7/2006 | Kanechika | C04B 35/581 505/100 |
| 2008/0213119 A1 | 9/2008 | Wolz | |
| 2008/0220963 A1 * | 9/2008 | Takahashi | C04B 35/593 501/97.4 |
| 2008/0271599 A1 | 11/2008 | Edlinger | |
| 2009/0325116 A1 * | 12/2009 | Matsuura | B23K 1/0016 432/198 |
| 2010/0044002 A1 * | 2/2010 | Leffew | B22D 1/005 164/266 |
| 2010/0127418 A1 * | 5/2010 | Davidson | C04B 35/52 264/85 |
| 2010/0242814 A1 * | 9/2010 | Jeney | C10J 3/00 110/341 |
| 2010/0274292 A1 | 10/2010 | Wolff et al. | |
| 2011/0006450 A1 * | 1/2011 | Stephan | A61C 13/203 264/16 |
| 2011/0171589 A1 | 7/2011 | Ha et al. | |
| 2011/0269088 A1 * | 11/2011 | Rohner | A61C 13/20 432/120 |
| 2012/0090411 A1 | 4/2012 | Perlinger et al. | |
| 2012/0174404 A1 | 7/2012 | Wolz | |
| 2013/0029279 A1 | 1/2013 | Jussel | |
| 2013/0149186 A1 * | 6/2013 | Hachenberg | B22F 3/003 419/57 |
| 2013/0241120 A1 | 9/2013 | Yamanishi et al. | |
| 2014/0051014 A1 | 2/2014 | Steinwandel et al. | |
| 2014/0123892 A1 * | 5/2014 | Vladimirov | C30B 11/00 117/223 |
| 2014/0127637 A1 | 5/2014 | Gardin | |
| 2014/0299195 A1 | 10/2014 | Noack et al. | |
| 2014/0348690 A1 * | 11/2014 | Chen | H01F 41/0266 419/38 |
| 2014/0352634 A1 | 12/2014 | Sullivan et al. | |
| 2015/0044622 A1 * | 2/2015 | Yang | C30B 33/12 432/200 |
| 2015/0287572 A1 | 10/2015 | Daugherty et al. | |
| 2015/0314131 A1 | 11/2015 | Stevenson et al. | |
| 2015/0335407 A1 | 11/2015 | Korten et al. | |
| 2016/0052055 A1 | 2/2016 | Reichert | |
| 2016/0184062 A1 * | 6/2016 | Jussel | A61C 13/20 264/16 |
| 2016/0199906 A1 | 7/2016 | Mochizuki | |
| 2016/0214327 A1 | 7/2016 | Uckelmann et al. | |
| 2016/0317257 A1 * | 11/2016 | Fornoff | A61C 13/20 |
| 2017/0167791 A1 | 6/2017 | He et al. | |
| 2017/0183231 A1 * | 6/2017 | Morris | C04B 35/524 |
| 2017/0191758 A1 | 7/2017 | He et al. | |
| 2017/0203362 A1 * | 7/2017 | Cha | B22F 3/003 |
| 2018/0072630 A1 * | 3/2018 | Beaman | B33Y 10/00 |
| 2018/0186646 A1 * | 7/2018 | Leisenberg | C04B 35/52 |
| 2018/0327325 A1 * | 11/2018 | Gangakhedkar | C04B 35/62222 |

FOREIGN PATENT DOCUMENTS

| | | |
|---|---|---|
| DE | 102009019041 | 11/2010 |
| DE | 202011005465 | 8/2011 |
| DE | 202011106734 | 1/2012 |
| DE | 202012004493 | 8/2012 |
| DE | 102011056211 | 2/2013 |
| DE | 102012100631 | 7/2013 |
| EP | 0094511 | 11/1983 |
| EP | 0480107 | 4/1992 |
| EP | 0524438 | 1/1993 |
| EP | 1645351 | 4/2006 |
| EP | 1885278 | 1/2009 |
| EP | 2470113 | 8/2013 |
| JP | S5194407 | 8/1976 |
| JP | S5681603 | 7/1981 |
| JP | S58141305 | 8/1983 |
| JP | S60224702 | 11/1985 |
| JP | H0525563 | 2/1993 |
| JP | H06330105 | 11/1994 |
| JP | 2002372373 | 12/2002 |
| WO | 2008021495 | 2/2008 |
| WO | 2009020378 | 2/2009 |
| WO | 2009029993 | 3/2009 |
| WO | 2011020688 | 2/2011 |
| WO | 2013053950 | 4/2013 |
| WO | 2014047664 | 4/2014 |
| WO | 2014169304 | 10/2014 |

OTHER PUBLICATIONS

Pages 5 to 7 of catalogue of Amann Girrbach AG "Ceramill Agrotherm/Argovent" published Oct. 2012.
https://de.wikipedia.org/wiki/Stahl, retrieved Oct. 18, 2018 and English translation.
http://web.mitedu/2.813.www/readins/Ellingham_diagrams.pdf, retrieved on Oct. 18, 2018.

* cited by examiner

SINTERING APPARATUS

BACKGROUND

The invention relates to a sintering apparatus for sintering at least one workpiece, in particular a dental workpiece, with a sintering chamber for receiving the workpiece to be sintered during the sintering operation, wherein the sintering chamber is delimited by a base area of the sintering apparatus on which the workpiece can be placed during the sintering operation, wherein the sintering apparatus has at least one gas feed for introducing protective gas into the sintering chamber. The invention also relates to a method for sintering at least one workpiece, in particular a dental workpiece, in a sintering apparatus and also to an arrangement with at least one workpiece, in particular a dental workpiece, to be sintered and a sintering apparatus.

For the sintering of workpieces, in particular dental workpieces, a wide variety of sintering apparatuses have already been proposed in the prior art. DE 20 2011 106 734 U1 discloses a sintering chamber in which a slight negative pressure is intended to be produced in the upper region of a sintering space by a Venturi effect. In DE 20 2011 005 465 U1, it is proposed for example to lower the workpieces to be sintered in an annular sintering tray completely within sintering granules, so that the sintering granules completely surround and cover the workpieces to be sintered during the sintering operation. It has been found from practical experience that, with this arrangement, the process of shrinkage of the workpiece that occurs during the sintering operation may be hindered, which leads to unwanted deformation of the workpiece. A sintering apparatus of the generic type is also disclosed for example in WO 2011/020688 A1. In this document it is proposed that a quartz tray, which has the base area, should be filled during the operation of the sintering apparatus with inert beads, into which the article to be sintered is placed. To enter the quartz tray, that is to say the area around the workpiece to be sintered, the protective gas must flow around the quartz tray in order to enter the interior of the quartz tray from above. It has been found that, with this type of arrangement, a relatively great amount of protective gas is consumed during the sintering operation and impairments of the article to be sintered can nevertheless be caused by remains of another gas, in particular oxygen.

In DE 10 2011 056 211, it is proposed to cover the tray in which the article to be sintered is located by a closure element, wherein the covered tray can be flowed through by protective gas or inert gas. However, it is not explained in this document what form the covered tray should take to allow a flow to pass through it in this way.

DE 10 2009 019 041 A1 concerns a sintering apparatus for sintering magnesium or magnesium alloys at relatively low sintering temperatures of 600° C. to 642° C. under a protective gas atmosphere. In FIG. 5 of this document, it is proposed to pass any impurities of the gas in the outer region of the crucible through getter material before this impurity can get into the inner region of the crucible.

Extensive tests with a wide variety of sintering apparatuses have shown that even small changes in the structure of arrangements and sintering apparatuses of the generic type can often have an unexpectedly strong influence on the quality of the sintering result, in particular at very high sintering temperatures of sometimes over 1200° C. In particular, it is difficult with arrangements known in the prior art to ensure that no undesired discoloration or oxidation of the workpiece to be sintered occurs.

SUMMARY

The object of the invention is to improve a sintering apparatus of the generic type further to the extent that on the one hand it can be constructed as simply as possible and on the other hand undesired adverse influences on the article to be sintered are avoided as far as possible in the case of the article to be sintered.

For this purpose, a sintering apparatus according to the invention provides that the gas feed is arranged on the side of the base area that is facing away from the sintering chamber and the base area has at least one through-flow region that is permeable to the protective gas for the introduction of the protective gas coming from the gas feed into the sintering chamber.

In other words, it is consequently provided that the base area itself has a corresponding through-flow capability, by which the protective gas coming from the gas feed can reach the workpiece to be sintered. This is a very direct feed of the protective gas to the workpiece to be sintered, which on the one hand allows a very simple construction of the sintering apparatus, but on the other hand ensures that the protective gas reaches the workpiece as directly and completely as possible, whereby the workpiece is protected particularly effectively from undesired discolorations or oxidations during the sintering operation. The base area is the area of the sintering apparatus that is intended for the workpiece to be placed on directly or with a protective material placed in between during the sintering operation. The base area is consequently the area of the sintering apparatus that carries the workpiece to be sintered during the sintering operation.

In a preferred embodiment, the base area delimits the sintering chamber downwardly in the operating position during the sintering operation, wherein the gas feed is arranged under the base area. Preferred variants provide in this connection that the gas feed opens out into a gas distribution chamber of the sintering apparatus, preferably with a gas distribution cap arranged in between, wherein the gas distribution chamber is arranged on the side of the base area that is facing away from the sintering chamber. It is favorable in connection with this if the gas distribution chamber is arranged under the base area in the operating position during the sintering operation.

There are various possibilities for forming the through-flow region in the base area. The through-flow region in the base area may take the form of at least one through-flow opening, preferably a number of through-flow openings, in the base area. In the case of a number of through-flow openings, a kind of screen-like construction of the base area may be obtained. It may however also be the case that the through-flow region in the base area takes the form of at least one open-pore region in the base area. The through-flow openings are usually created artificially, for example by drilling, punching, etching or the like, whereas in the case of base areas with open-pore regions a porosity with good gas permeability that already exists intrinsically in the material is used for passing the protective gas through the base area. It is of course also possible for the two variants to be combined with one another to form the through-flow region in the base area.

A base area with at least one open-pore region may be a high-temperature-resistant gas-permeable shaped body of a metallic or ceramic kind This base area may have inert properties and/or be formed as a separating layer in sheet form. Possible materials for such base areas are ZrO2, Al2O3, SiC, SiN, HT alloys, etc.

Particularly preferred embodiments of the invention provide that the base area forms the bottom of a sintering tray of the sintering apparatus for receiving the workpiece to be sintered during the sintering operation. The sintering chamber is then favorably the interior space of the sintering tray.

Sintering apparatuses according to the invention are generally used in sintering furnaces. Many of the sintering furnaces known in the prior art have a kind of flue for carrying away the gases given off during the sintering operation, which brings about a certain flue effect and consequently a perturbation of the atmosphere in the sintering furnace. In order that these flows in the sintering furnace do not cause any perturbation or turbulence of the protective gas atmosphere forming around the workpiece, preferred embodiments of the sintering apparatus according to the invention provide that the sintering chamber is closed off upwardly by a covering in an operating position during the sintering operation. The covering may be gas-tight, but may also have at least one through-flow opening, preferably a number of through-flow openings, and/or at least one open-pore region. Open-pore regions of the covering may be formed in the same way as the open-pore regions of the base area.

The component parts of the sintering apparatus may preferably consist of metal, metal alloys or else ceramic.

As already mentioned at the beginning, apart from the sintering apparatus, the invention also relates to an arrangement with at least one workpiece, in particular a dental workpiece, to be sintered and a sintering apparatus. This is a sintering apparatus according to the invention and the workpiece is favorably placed on the base area directly or with a supporting material placed in between, in particular during the sintering operation.

Particularly preferred variants of such an arrangement provide that the protective gas coming from the gas feed can only be fed to the workpiece through the supporting material. As a result, the gas stream fed to the workpiece undergoes further cleaning in the supporting material in the direct vicinity of the workpiece to be sintered, whereby foreign gases that disturb the sintering operation are filtered out from the gas stream fed to the workpiece, and consequently a very clean protective gas atmosphere is achieved in the direct vicinity of the workpiece during the sintering operation. As a result of this, undesired discolorations and other impairments of the workpiece during the sintering operation can be avoided particularly well. In particular in the case of these variants, it is ensured that the gas stream fed to the workpiece is cleaned by means of the supporting material directly before it reaches the region around the workpiece. As a result, a high quality of the workpieces to be produced along with relatively low protective gas consumption can be ensured even in the case of very high sintering temperatures of over 1200° C.

Particularly preferred variants provide that the supporting material completely covers the through-flow region or is arranged in the through-flow region over its full surface area or forms the entire surface area of the through-flow region.

Gases that may be used as the protective gas are those that are already used as such in the prior art, in particular inert gases. The protective gas serves for displacing the air and other gases from the area around the workpiece and for providing a gas shroud that surrounds the article to be sintered during the sintering operation and does not react with the article to be sintered. Argon and/or nitrogen may be used for example as the protective gas.

It is favorable if the supporting material lies on the base area. Alternatively, the supporting material may however also be integrated in the base area. Since the discolorations and other impairments of the workpiece during the sintering operation are usually attributable to oxidation, particularly preferred embodiments of the invention provide that the supporting material is a material that adsorbs oxygen. The term material in this connection also includes a mixture of different materials. In other words, the supporting material consequently has at least a certain affinity, preferably a good affinity, for oxygen. It is particularly preferably provided that the supporting material has a greater affinity for oxygen than the workpiece. Affinity for oxygen is understood here as meaning the tendency of a substance or a material to adsorb oxygen, in particular by chemical reaction. The greater the affinity for oxygen of a substance or material, the more likely it is that oxygen will be adsorbed, and therefore the more oxygen will be adsorbed, on this substance or this material. Oxygen or residual oxygen in this case means the free unadsorbed oxygen, which can lead to unwanted oxidation of the workpiece. Apart from possibly present oxygen radicals, this oxygen is generally present in the air as a molecule with two oxygen atoms.

Particularly preferred embodiments of the invention provide that the supporting material comprises or consists of granular loose material and/or at least one gas-permeable solid. In the case of granular loose material, the supporting material may be formed of or comprise ceramic supporting grains, such as for example ceramic sintering beads known per se, for example of zirconium dioxide partially stabilized with yttrium. In preferred embodiments, the ceramic supporting grains have a diameter of between 0.4 mm and 2 mm. It has been found that, in the case of arrangements according to the invention, when the protective gas is passed through the supporting material a considerable cleaning effect is achieved even by using such a commonplace supporting material. In addition to the ceramic supporting grains, however, additional materials may also be added to the supporting material, for example to reduce the oxygen content. These materials or material mixtures may be formed as supporting material, but also as a gas-permeable, preferably open-pore solid. Mixed forms in which the supporting material consists of loose material or loose material mixtures and at least one such gas-permeable solid are also possible.

The term dental workpiece comprises all those artificially fabricated components that can be used in dentures as a replacement for natural teeth or component parts of teeth, and also aids for attaching or producing such tooth replacement parts. The workpieces to be sintered are particularly preferably such workpieces of metal or metal alloys. The workpieces may be sintered in the green or white state. In arrangements according to the invention, and consequently also during the sintering operation, the workpieces lie on the supporting material, preferably directly. They therefore protrude at least partly, preferably greatly, beyond the supporting material, whereby problems with shrinkage occurring during the sintering operation are avoided.

As mentioned at the beginning, apart from an arrangement according to the invention, the invention also relates to a method according to the invention for sintering a workpiece, in particular a dental workpiece, with a sintering apparatus according to the invention. Where applicable, the statements made above concerning the embodiment according to the invention of a sintering apparatus and/or of the arrangement are also applicable to the method according to the invention described below. It is at least provided in the case of the method according to the invention that the workpiece to be sintered is placed on the base area directly or with a supporting material placed in between during the sintering operation and the protective gas coming from the gas feed is directed to the workpiece and/or introduced into the sintering chamber through the through-flow region of the base area, preferably only through the through-flow region of the base area.

BRIEF DESCRIPTION OF THE DRAWINGS

Various sintering apparatuses and arrangements according to the invention, with which methods according to the invention also can be carried out, are represented in the figures described below, in which.

DETAILED DESCRIPTION OF THE PREFERRED EMBODIMENTS

Figure 1:
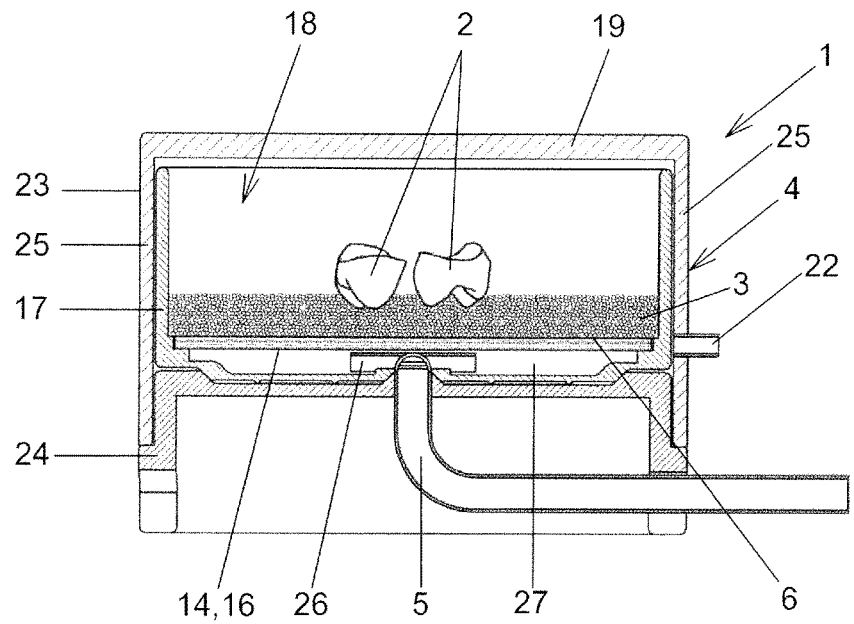
FIGS. 1 to 6 show various embodiments of sintering apparatuses according to the invention.

In FIGS. 1 to 6, arrangements 1 with at least one dental workpiece 2 to be sintered and with at least one supporting material 3 and with a sintering apparatus 4 for sintering the workpiece 2 are respectively shown. The sintering apparatuses 4 have in each case at least one gas feed 5 for protective gas and at least one base area 6. Favorably, and as is the case here, the gas feed 5 is formed as a gas feed tube. In preferred variants, it could also be referred to as a gas feed line 5. The base area 6 is that area on which the workpiece can be placed during the sintering operation. The base area 6 could to this extent also be referred to as a bottom area. In all of the figures mentioned, the arrangement 1 is shown during the sintering operation. In the operating position respectively represented, the workpieces 2 to be sintered lie on the supporting material 3 and favorably protrude at least partially, preferably greatly, beyond the supporting material 3. In the embodiments of FIGS. 1 to 5, the protective gas coming from the gas feed 5 is only fed to the workpiece 2 through the supporting material 3. In these variants, the supporting material 3 lies on the base area 6. As still to be explained further below in detail, in the variant according to FIG. 6 the supporting material 3 has either been omitted or is integrated in the base area 6. The supporting material 3 is favorably an oxygen-adsorbing material. The supporting material 3 may take the form of granular loose material and/or at least one gas-permeable solid or comprise such configurations.

Figure 2:
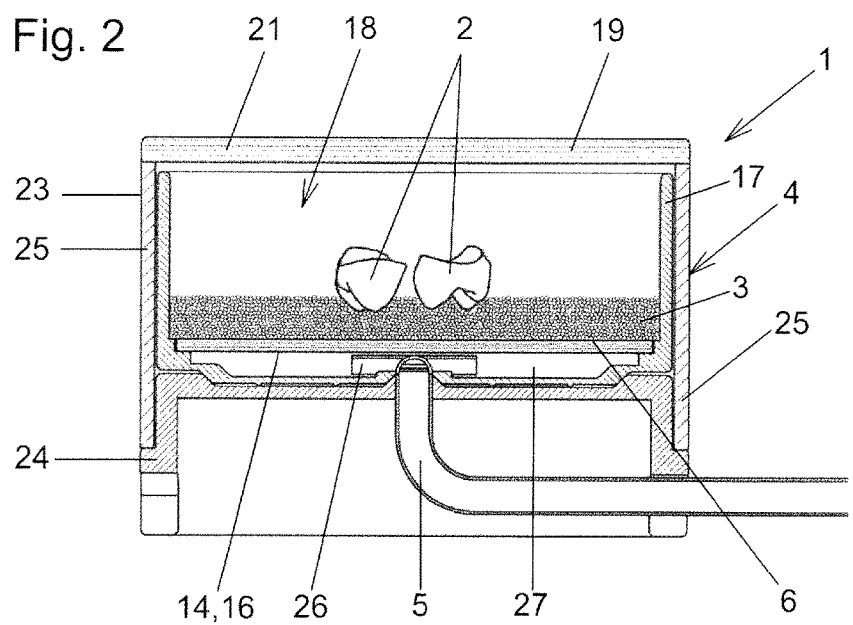
Figure 3:
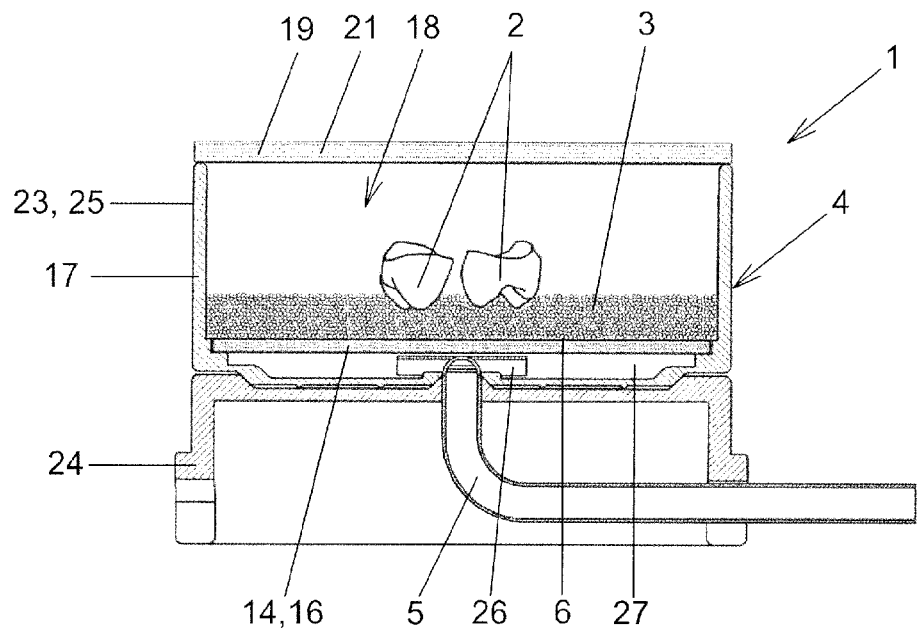

In the variants shown according to FIGS. 1 to 6 it is provided that the gas feed 5 is arranged on the side of the base area 6 that is facing away from the sintering chamber 18 and, for introducing the protective gas coming from the gas feed 5 into the sintering chamber 18, the base area 6 has at least one through-flow region 14 that is permeable to the protective gas. In the operating position represented, during the sintering operation, the sintering chamber 18 is delimited downwardly by the base area 6 and the gas feed 5 is arranged under the base area 6. The gas feed 5 opens out into a gas distribution chamber 27 of the sintering apparatus 4, wherein the gas distribution chamber 27 is arranged on the side of the base area 5 that is facing away from the sintering chamber 18. In the operating position represented, the gas distribution chamber 27 of these exemplary embodiments is consequently arranged under the base area 6 during the sintering operation. For the most uniform possible distribution of the protective gas flowing out from the gas feed 5, a gas distribution cap 26 may be provided in the gas dissolution chamber 27, as shown in FIGS. 1 to 3 and also FIGS. 5 and 6 and as represented particularly clearly in FIG. 7.

Figure 4:
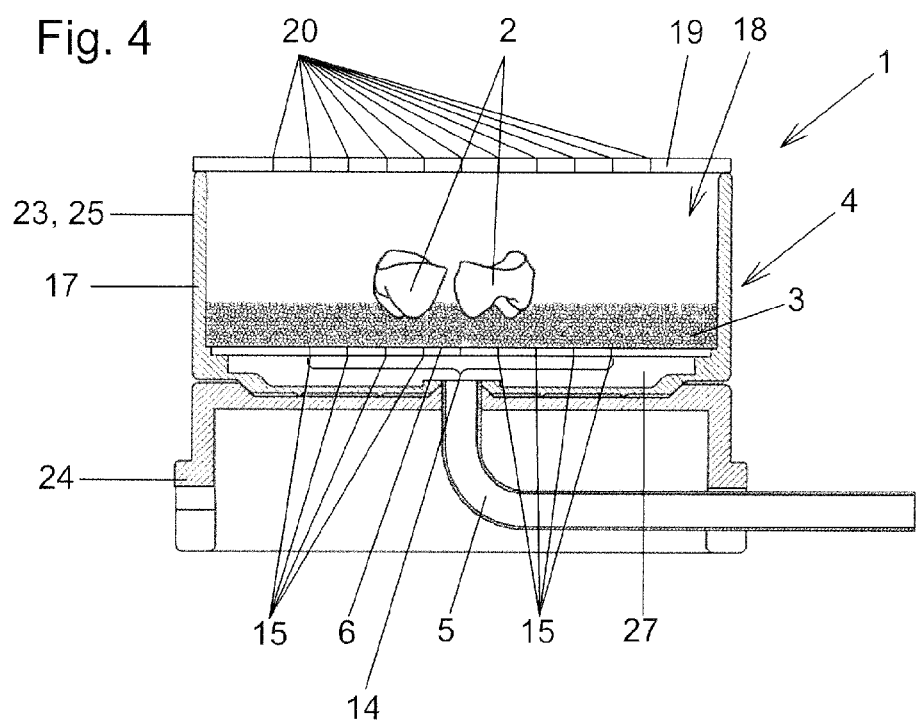
Figure 5:
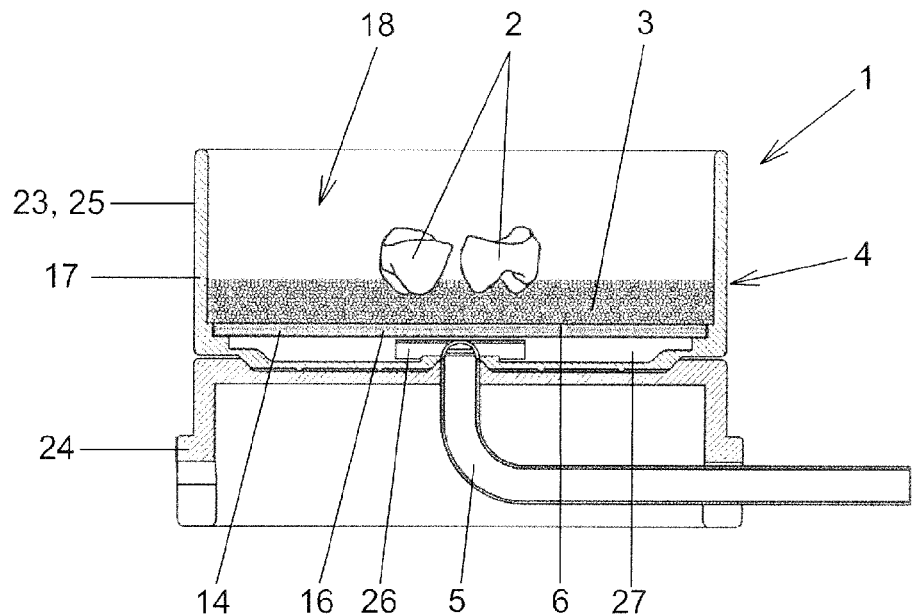
Figure 6:
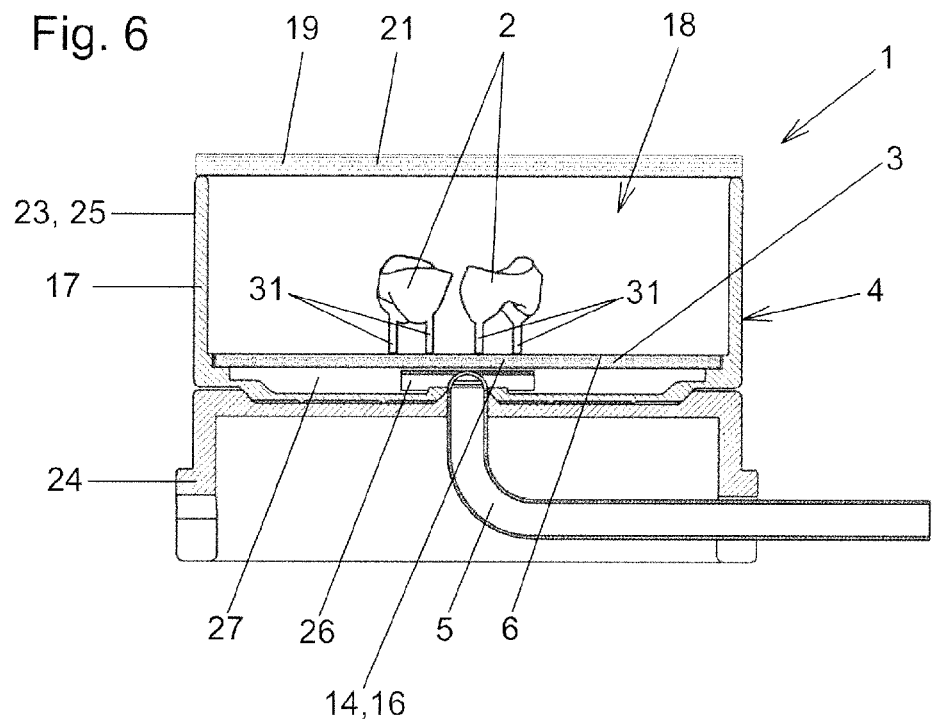

This construction also achieves the effect that the protective gas can only be fed to the workpiece 2 through the supporting material 3, in that the protective gas coming from the gas feed 5 can only be fed to the workpiece 2 through the through-flow region 14 in the base area 6, wherein the supporting material 3 completely covers the through-flow region 14, as is the case in the variants of an embodiment according to FIGS. 1 to 5, or forms the full surface area of the through-flow region 14, as is the case in FIG. 6.

The through-flow region 14 in the base area 6, through which the protective gas can enter the sintering chamber 18, may take the form of at least one through-flow opening 15, preferably a number of through-flow openings 15, in the base area 6. This is the case in the exemplary embodiment according to FIG. 4. Alternatively, the base area 6 may also have at least one open-pore region 16 or be formed in its entirety as such an open-pore region 16, as is the case in the variants of an embodiment according to FIGS. 1 to 3 and also 5 and 6. In the embodiments according to FIGS. 1 to 6, the base area 6 forms the bottom of a sintering tray 17 of the sintering device 4 for receiving the workpiece 2 to be sintered during the sintering operation. The sintering chamber 18 lies in the interior space of the sintering tray 17. In the variants according to FIGS. 1 to 5, in each case the supporting material 3 completely covers the through-flow region 14 in the base area 6. In the variant according to FIG. 6, the supporting material 3 has either been omitted entirely or is integrated in the base area 6. In the case of the last-mentioned variant, the through-flow region 14 may be formed completely by the supporting material 3. The sintering trays 17 of the variants of an embodiment according to FIGS. 1 to 6 are in each case supported on a base carrier 24 of the sintering apparatus 4.

In the variant of an embodiment according to FIG. 1, the sintering tray 17 is surrounded by a hood-like outer wall 23, which is supported on the base carrier 24. This outer wall 23 of the sintering apparatus 4 comprises both the side wall 25 and the covering 19. In the exemplary embodiment according to FIG. 1, the covering 19 is of a gas-tight form. In order to allow gas to be let out from the sintering chamber 18, in this exemplary embodiment according to FIG. 1 a gas outlet 22 is provided in the outer wall 23 or the side wall 25 thereof. Both the air displaced from the sintering chamber 18 by protective gas and also any waste gases that may be produced at the beginning of the sintering operation, and also excess protective gas, can flow out through this gas outlet 22. The covering 19 prevents flows produced outside the sintering apparatus 4 in the sintering furnace that is not represented here from being able to disturb the protective gas atmosphere in the sintering chamber 18.

During the operation of the sintering apparatus 4 or arrangement 1 according to the invention as shown in FIG. 1, it is ensured that the protective gas is only fed to the workpiece 2 through the supporting material 3. For this purpose, the protective gas leaves the gas feed 5 and is distributed by the gas distribution cap 26 in the gas distribution chamber 27. It then passes through the through-flow region 14 of the base area 6 and is thus directed to the workpiece 2 or introduced into the sintering chamber 18, wherein it is made to pass completely through the supporting material 3, which brings about the process mentioned at the beginning of cleaning the protective gas and in particular of eliminating, or at least further reducing, the residual oxygen content. Before the actual sintering process begins, the sintering chamber 18 is flooded with protective gas, so that the air component that is previously present is displaced, preferably completely, from the sintering chamber 18. The sintering operation favorably only begins after completion of this flooding of the sintering chamber 18 with protective gas. As pointed out at the beginning, the protective gas favorably has a greater density than the air.

The sintering apparatus 4 or the arrangement 1 of the exemplary embodiment according to FIG. 2 only differs from the exemplary embodiment according to FIG. 1 by the structure of the outer wall 23. In the variant according to FIG. 2, the outer wall 23 is of a two-part construction. It has a side wall 25 in the form of the shell of a cylinder, on which a separately formed covering 19 lies. In this embodiment according to FIG. 2, the covering 19 is formed as an open-pore region 21, so that the gases emerging from the sintering chamber 18 can pass through it. This makes it possible to dispense with the gas outlet 22 in the side wall 25. In spite of its open-pore design, the covering 19 in this exemplary embodiment still ensures that no turbulences produced outside the sintering apparatus 4 can have an influence on the protective gas atmosphere in the sintering chamber 18.

It is pointed out for the sake of completeness that the open-pore regions 21 in the covering 19 and also the open-pore regions 16 in the base area 6 may be formed over the entire covering 19 or base area 6 or else only over partial regions of the respective covering 19 or base area 6.

In FIG. 3 there is shown a further modified variant of a sintering apparatus 4 that dispenses with a separate side wall 25. In this variant, the outer wall of the sintering tray 17 at the same time forms the outer wall 23 of the sintering apparatus 4. The covering 19, which is likewise of an open-pore form here, lies directly on the upper periphery of the sintering tray 17. FIG. 4 shows a modification of the variant according to FIG. 3 in which the through-flow region 14 in the base area 6 is not formed as an open-pore region but as an arrangement of multiple through-flow openings 15 that are distributed over its surface area. In this variant, the covering 19 likewise has through-flow openings 20 that are distributed over its surface area. In addition, this variant dispenses with the optional gas distribution cap 26. It is pointed out for the sake of completeness that, in the case of all of the variants of an embodiment shown here, the open-pore region 16 can, where applicable, be replaced by the through-flow openings 15 in the respective base area 6 and the open-pore regions 21 can be replaced by the respective through-flow openings 20 in the covering 19, and vice versa. There may also be only a single through-flow opening 15 or 20, respectively. In all of the embodiments, it is also possible for the gas distribution cap 26 to be present or omitted.

FIG. 5 substantially corresponds to the variant according to FIG. 3, though in FIG. 5 the covering 19 has been omitted completely. This variant is appropriate especially whenever no turbulences or flows occurring outside the sintering apparatus 1 can disturb the protective gas atmosphere in the sintering chamber 18 and the protective gas has a higher density than the air to be displaced.

FIG. 6 shows further modifications of the variant according to FIG. 5. In a first variant, it is shown by way of example in the case of the embodiment according to FIG. 6 that there does not have to be any supporting material 3 at all. In the case of this variant, the workpieces to be sintered stand with their supporting feet 31 directly on the base area 6. Such arrangements 1 are appropriate especially whenever workpieces 2 of ceramic material are to be sintered. By contrast, in another variant, likewise illustrated by FIG. 6, it is provided that the supporting material 3 is formed as a gas-permeable solid and is integrated in the base area 6. This is also represented in FIG. 6 by the addition of the reference sign 3. In the case of the variant discussed first, entirely without supporting material 3, it is of course also possible to leave out the reference sign 3 in FIG. 6. In the case of the variant with supporting material 3, the protective gas is only fed to the workpiece 2 through the supporting material 3. In the case of this embodiment, the workpieces 2 stand with their supporting feet 31 directly on the base area 6. In this variant, the supporting material 3 forms the through-flow region 14 over its full surface area. As an alternative to the gas-permeable solid, the supporting material 3 in this variant could also be arranged in a body similar to a mesh-like cage, the upper mesh area of which then forms the base area 6. In this variant, the supporting material 3 would then be arranged in the through-flow region 14 over its full surface area.

Figure 7:
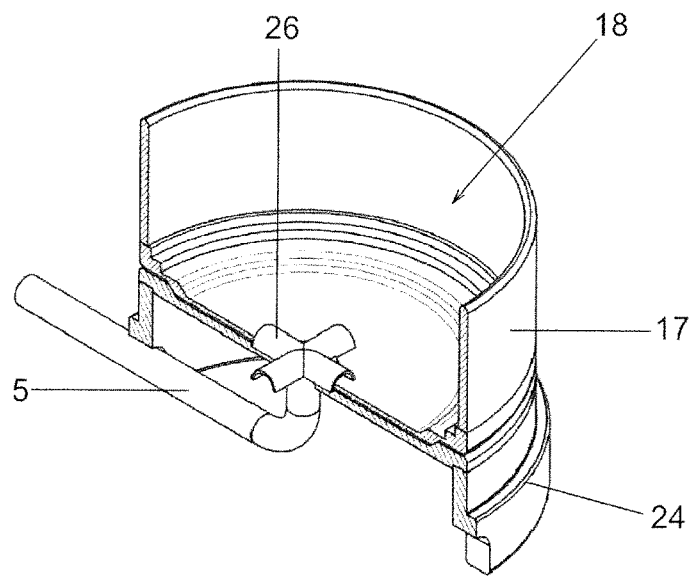
FIG. 7 shows a representation of the gas distribution cap according to FIGS. 1 to 3 and 5 and also 6.
Figure 8:
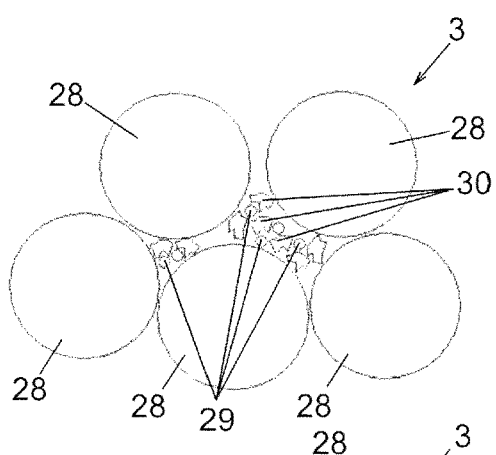
FIGS. 8 and 9 show various variants of the supporting material.
Figure 9:
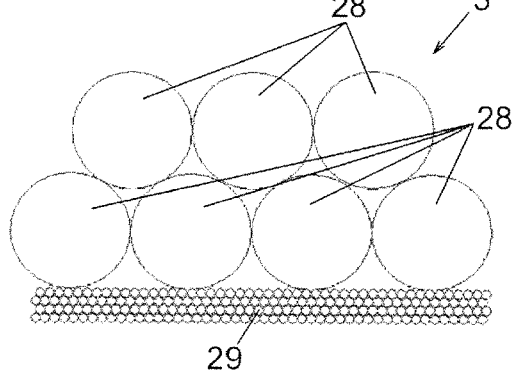

FIG. 7 is a partially sectional representation that serves merely for illustrating a possible embodiment of the gas distribution cap 26.

Even if the exemplary embodiments according to FIGS. 1 to 6 all show that the base area 6 is the bottom of a sintering tray, it should be pointed out for the sake of completeness that a sintering tray 17 does not necessarily have to be present. The base area 6 may also be formed directly by the base carrier 24 or in some other way.

As already explained at the beginning, the supporting material 3 may for example be granules, a powder or a granule-powder mixture. The supporting material 3 may however also take the form of a gas-permeable solid or comprise such a solid. Mixed forms thereof are also possible. The supporting material 3 may for example be customary, commercially available sintering beads as they are known, for example of zirconium dioxide partially stabilized with yttrium. It has been found that such a supporting material 3 also already has a certain cleaning function and especially has an oxygen-binding function. Other ceramic supporting grains or mixtures thereof may well also be used as supporting material 3. In order to improve the cleaning function, and in particular the binding of residual oxygen, it is also possible however to mix with these ceramic supporting grains 28 an additional material 29, which may in particular have a greater affinity for oxygen than the ceramic supporting bodies 28 themselves. The greater affinity for oxygen of the additional material 29 may be achieved for example by the additional material that is used being a material or material mixture which comprises at least one chemical element or at least one chemical compound that has a greater affinity for oxygen than the material of the workpiece 2 or than the material of the ceramic supporting grains 28. In particular, the additional material 29 may serve the purpose of chemically binding the residual oxygen to it. If the additional material 29 comprises components that could become attached to the workpiece 2 during the sintering operation, it is favorable if an intermediate layer of ceramic supporting grains 28 is present between the additional material 29 and the workpiece 2. The various components of the supporting material 3 may consequently be in the form of a homogeneous or else a homogeneous mixture. Additional materials 29 with great affinity for oxygen may for example be metals or metal alloys. However, ceramic additional materials also come into consideration. The additional material 29 may likewise be in the form of pellets or powder. The additional material may for example be cobalt, chromium, molybdenum, titanium or titanium alloys. The supporting material 3 may consequently be for example a loose material consisting of two components, such as for example the ceramic supporting grain 28 and the additional material 29. However, multi-component mixtures are also conceivable. For example, a third component may be present in the supporting material 3 in the form of a carrier substance 30. This carrier substance 30 may serve the purpose that the additional material 29 is adsorbed on it. It may for example be ceramic materials such as aluminum-corundum. The carrier substance 30 favorably has a rough and/or abrasive surface. The grain diameter of the ceramic supporting grains 28 is favorably greater than the grain diameter of the carrier substance 30. The grain diameter of the additional materials 29 is then in turn favorably smaller than that of the carrier substance 30. Even when the carrier substance is absent, the grain diameter of the supporting grains is favorably greater than that of the additional material. FIG. 10 shows a supporting material 3 in the form of such a three-component mixture. The smaller grain diameter allows the carrier substance 30 together with the additional material 29 adsorbed on it to slide through between the ceramic supporting bodies 28 and be deposited at least substantially in the lower region of the supporting material 30. This has the effect, as already mentioned above, of achieving an embodiment in which at least some of the ceramic supporting bodies 28 are arranged between the workpiece 2 and the remaining component parts of the supporting material 3. FIG. 11 shows a further variant of the supporting material 3. This is a mixture of granular loose material in the form of the ceramic supporting grains 28 and a gas-permeable solid arranged thereunder, consisting of the additional material 29, which in this exemplary embodiment may in turn have a greater affinity for oxygen than the ceramic supporting grains 28 as a result of the aforementioned measures. It should be pointed out for the sake of completeness that gas-permeable solids may also be used exclusively as the supporting material 3.

Legends for the Reference Signs 1 arrangement
2 workpiece
3 supporting material
4 sintering apparatus
5 gas feed
6 base area
14 through-flow region
15 through-flow opening
16 open-pore region
17 sintering tray
18 sintering chamber
19 covering
20 through-flow opening
21 open-pore region
22 gas outlet
23 outer wall
24 base carrier
25 side wall
26 gas distribution cap
27 gas distribution chamber
28 ceramic supporting grain
29 additional material
30 carrier substance
31 supporting foot

The invention claimed is:

1. A sintering apparatus for sintering a workpiece, comprising: a sintering chamber for receiving the workpiece to be sintered during a sintering operation, the sintering chamber is delimited by a base area of the sintering apparatus on which the workpiece can be placed during the sintering operation, a gas feed for introducing protective gas into the sintering chamber; the gas feed is arranged on a side of the base area that is facing away from the sintering chamber, and the base area has at least one through-flow region that is permeable to the protective gas for introduction of the protective gas coming from the gas feed into the sintering chamber.

2. The sintering apparatus as claimed in claim 1, wherein the base area delimits the sintering chamber downwardly in an operating position during the sintering operation and the gas feed is arranged under the base area.

3. The sintering apparatus as claimed in claim 1, wherein the gas feed opens out into a gas distribution chamber of the sintering apparatus, and the gas distribution chamber is arranged on a side of the base area that is facing away from the sintering chamber.

4. The sintering apparatus as claimed in claim 3, wherein the gas distribution chamber is arranged under the base area in the operating position during the sintering operation.

5. The sintering apparatus as claimed in claim 1, wherein the through-flow region in the base area comprises at least one through-flow opening in the base area or at least one porous region in the base area or a combination thereof.

6. The sintering apparatus as claimed in claim 1, wherein the base area forms a bottom of a sintering tray of the sintering apparatus for receiving the workpiece to be sintered during the sintering operation.

7. The sintering apparatus as claimed in claim 6, wherein the sintering chamber is an interior space of the sintering tray.

8. The sintering apparatus as claimed in claim 1, wherein the sintering chamber is closed off upwardly by a covering in an operating position during the sintering operation.

9. The sintering apparatus as claimed in claim 8, wherein the covering is gas-tight.

10. An arrangement with the workpiece to be sintered and a sintering apparatus as claimed in claim 1, wherein the workpiece is placed on the base area directly or with a supporting material placed in between.

11. The arrangement as claimed in claim 10, wherein the supporting material lies on the base area or is integrated therein.

12. The arrangement as claimed in claim 10, wherein the protective gas coming from the gas feed is only fed to the workpiece through the supporting material.

13. The arrangement as claimed in claim 10, wherein the supporting material completely covers the through-flow region or is arranged in the through-flow region over a full surface area thereof or forms an entire surface area of the through-flow region.

14. The arrangement as claimed in claim 10, wherein the supporting material is a material that adsorbs oxygen.

15. A method for sintering the workpiece with a sintering apparatus as claimed in claim 1, the method comprising: placing the workpiece to be sintered on the base area directly or with a supporting material placed in between, and during the sintering operation, directing the protective gas coming from the gas feed to the workpiece or introducing the protective gas into the sintering chamber through the through-flow region of the base area.

16. The method of claim 15, wherein the protective gas is introduced only through the through-flow region of the base area.

17. The sintering apparatus as claimed in claim 8, wherein the covering has at least one through-flow opening or at least one porous region, or a combination thereof.

18. The arrangement as claimed in claim 10, wherein the supporting material has a greater affinity for oxygen than the workpiece.

\* \* \* \* \*